Oct. 18, 1949.  W. J. COULTAS  2,484,981
WINDROWING ATTACHMENT FOR MOWERS
Filed Dec. 2, 1944  2 Sheets-Sheet 2
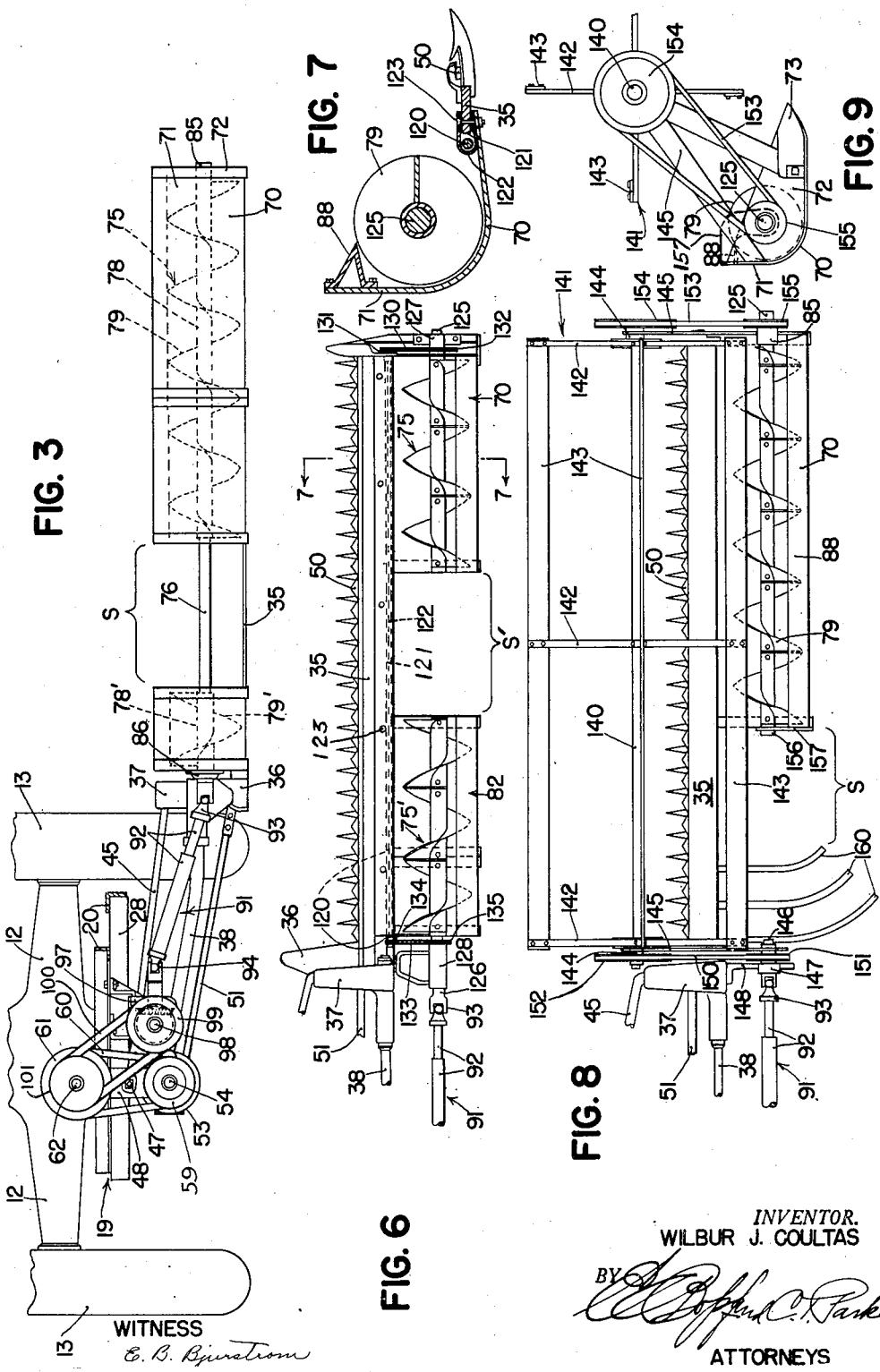
INVENTOR.
WILBUR J. COULTAS
BY
ATTORNEYS Patented Oct. 18, 1949

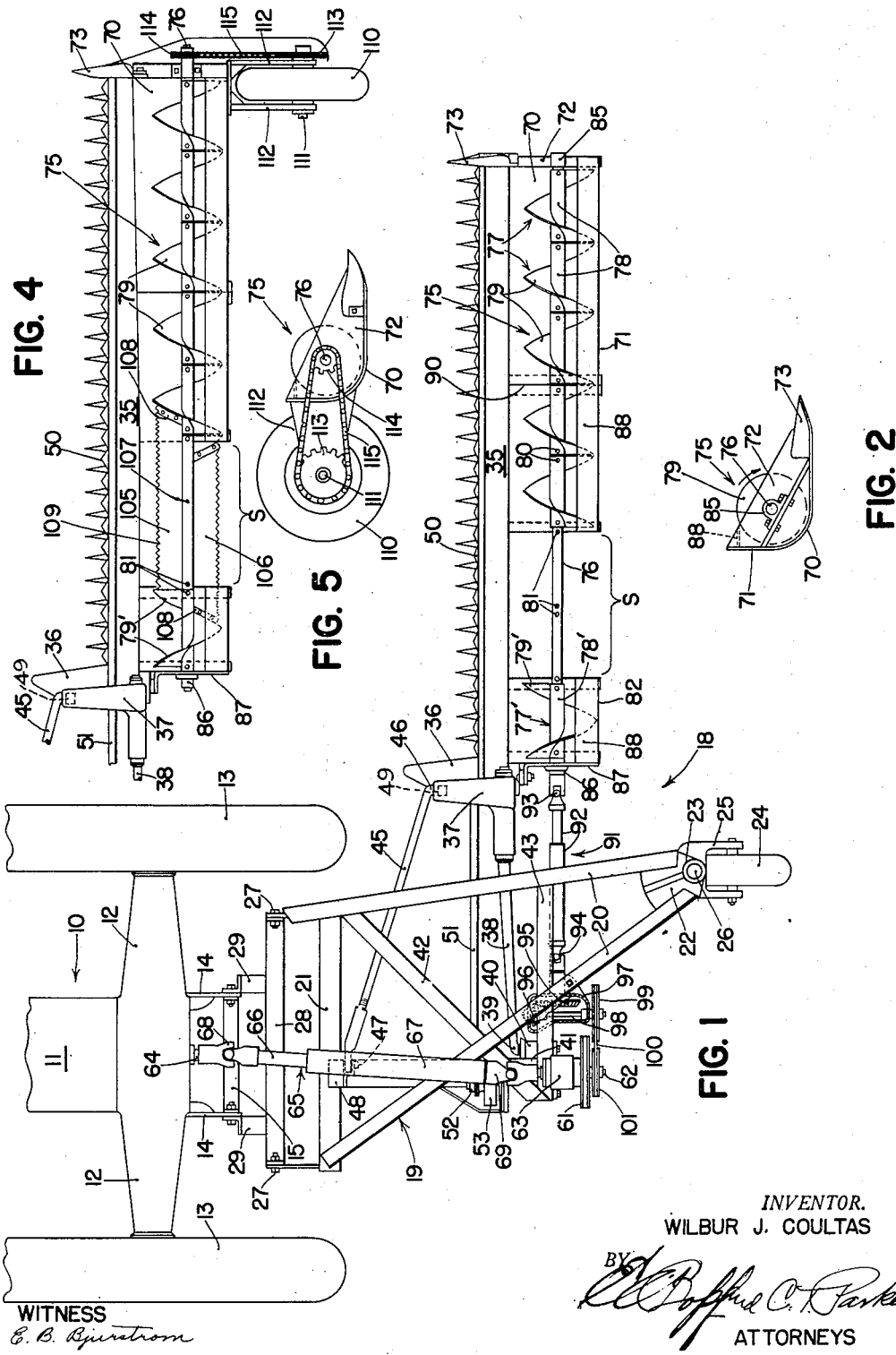

2,484,981

UNITED STATES PATENT OFFICE 2,484,981

WINDROWING ATTACHMENT FOR MOWERS

Wilbur J. Coultas, Moline, Ill., assignor to Deere & Company, Moline, Ill., a corporation of Illinois Application December 2, 1944, Serial No. 566,296

17 Claims. (Cl. 56—192)

The present invention relates generally to mowers and has for its principal object the provision of a novel and improved windrowing attachment for the cutter bar of the mower. Heretofore a limited amount of windrowing or swathing action has been obtained with a conventional mower by the use of swathing rods mounted on the cutter bar and curving rearwardly toward one end of the latter, but unless the cutter bar was comparatively short, a complete and satisfactory windrow was not obtainable thereby. Hence, it was considered necessary to use a conventional windrower when it was desired to form a windrow from a wide swath, for instance, in the order of seven or eight feet or more.

It is, therefore, a specific object of the present invention to provide an attachment for a conventional mower cutter bar, which will catch the severed crops which fall rearwardly over the bar and move them laterally to an open space behind a portion of the cutter bar, in which the crops are discharged in a windrow.

In the accomplishment of these objects, I have provided a trough of light weight construction, extending transversely along the back edge of the cutter bar, the trough preferably being formed in two sections, which are attached to the cutter bar in laterally spaced relation to provide an opening therebetween, and an auger conveyor in each of the trough sections adapted to move the severed crops laterally toward the opening and discharge them into the latter to form a windrow.

Another object of my invention relates to the provision of means for driving the outer auger section during operation. A related object has to do with the provision of a single auger shaft driven from the inner end, and having a pair of oppositely wound, helical conveyor flights, which terminate intermediate the ends of the cutter bar in laterally spaced relation to provide the space for the windrow.

Another specific object relates to the provision of a pair of axially extending straight beater blades between the adjacent end of the auger flights to assist in propelling the severed crops under the auger drive shaft.

Still another object of the present invention relates to the provision of an auger conveyor formed in sections slidable on the auger shaft, to make it possible to quickly and easily assemble the auger with the space for the windrow in the center of the cutter bar, or offset near one end of the latter, selectively. When the mower is intended for operation with a four wheel tractor, in which the front and rear wheels are in fore and aft alignment, respectively, it is desirable to have the space for the windrow in the center of the cutter bar, for on the succeeding trip around the field, the tractor straddles the previously formed windrow as the next swath is being cut. However, when the mower is intended for operation with a tricycle type tractor, the windrow should be laid in offset relation to the center of the cutter bar so that it will also be in offset relation to the centrally disposed front wheels of the tricycle type tractor. Preferably, the windrow space should be provided between the center and the stubbleward end of the mower, for this lays the windrow in the location which receives the least interference from the parts of the tractor and mower on the succeeding trip around the field.

Still a further object of my invention relates to the provision of means for driving the outer section of auger without the necessity for continuing the auger shaft across the windrow space, thus eliminating all possibilities for interference between the windrow and the auger shaft. In this connection, it is another specific object of my invention to provide a power transmitting shaft extending from the drive mechanism at the inner end of the cutter bar, outwardly along the cutter bar to a connection with the outer auger section for driving the latter. Another object relates to positioning the power transmitting shaft so that it will not interfere with the flow of severed crops into the windrow. In the accomplishment of these objects, I provide a power transmitting shaft which is disposed behind the rear edge of the cutter bar and journaled thereon, with a sheet metal housing for protecting this power transmitting shaft from the crops which fall over the sheet metal housing to the ground or to the trough behind the cutter bar.

Another object relates to a provision of a harvester reel, mounted on the cutter bar for insuring that the severed crops are properly swept rearwardly over the cutter bar into the influence of the auger conveyor. A related object has to do with the provision for transmitting power to the outer auger conveyor section through the harvester reel, thereby eliminating the necessity for the power transmitting shaft along the rear edge of the cutter bar.

Still another object relates to the provision of a ground engageable wheel mounted at the outer end of the cutter bar and connected with the auger shaft for driving the latter as the mower travels forwardly in the field.

These and other objects and advantages of my invention will be apparent to those skilled in the art after a consideration of the following description, in which reference is had to the drawings appended hereto, in which Figure 1 is a plan view of a tractor mower of the semi-mounted type, embodying the principles of my invention, and showing the rear portion of a tractor on which the mower is mounted.

Figure 2 is an elevational view of the outer end of the cutter bar and trough.

Figure 3 is a rear elevational view of the mower shown in Figures 1 and 2, the rear end of the mower frame and caster wheel being broken away.

Figure 4 is a plan view of the cutter bar, showing a modified form of windrowing attachment, and omitting the mower frame and tractor in the interests of simplification.

Figure 5 is an elevational view of the end of the cutter bar and conveyor shown in Figure 4.

Figure 6 is a plan view of a cutter bar and another modified form of my invention.

Figure 7 is a sectional elevational view taken along a line 7—7 in Figure 6, drawn on a larger scale.

Figure 8 is a plan view of a mower cutter bar embodying still another modified form of my invention and Figure 9 is an end elevational view of the modification of Figure 8.

Referring now to the drawings, and more particularly to Figures 1, 2 and 3, the tractor is indicated in its entirety by reference numeral 10 and includes a longitudinally extending body portion 11 provided with a pair of laterally extending rear axle housings 12 supported on a pair of laterally spaced traction wheels 13. The tractor 10 is provided with a draft frame including a pair of rearwardly extending members 14 rigidly fixed to the rear axle housings 12 and interconnected at the rear end by a transverse bar 15.

The mower is indicated in its entirety by reference numeral 18 and includes a generally triangular supporting frame 19 comprising a pair of main longitudinally extending frame members 20 which are laterally spaced apart at the forward end and interconnected by a transverse frame bar 21, converging rearwardly therefrom and rigidly secured at their rear ends to a supporting member 22 on a spindle bearing 23. A caster wheel 24 is journaled in a fork 25 which has a vertically disposed spindle 26 journaled in the vertically disposed spindle bearing 23. The forward end of the frame 19 is pivotally connected by transversely aligned horizontal pivot bolts 27 to a supporting bar 28 which is rigidly mounted on the tractor draft frame 14 by means of a pair of forwardly extending legs 29. Thus, as the tractor moves forwardly during operation, the rear end of the frame is carried on the caster wheel 24 and the forward end of the frame is carried on the pivot bolts 27 and swings vertically about the axis of the latter as the tractor and caster wheel follow the surface of the ground.

A transversely disposed cutter bar 35 is rigidly mounted on a shoe 36 which is pivotally mounted on a shoe-supporting arch 37 for vertical swinging movement about a fore and aft extending axis, as is well known to those skilled in the art, providing for raising and lowering the outer end of cutter bar 35. The shoe arch 37 is mounted on a supporting arm 38, which extends upwardly and laterally therefrom, and has a rear end portion 39 which turns rearwardly and is journaled in a bearing 40 mounted on the side of a drive housing 41 which is carried on a pair of transverse converging frame members 42, 43, forming a part of the mower frame 19. The supporting arm 38 is swingable vertically about the fore and aft extending axis of the supporting end portion 39, to permit the shoe arch 37 to be raised and lowered to adjust the height of the inner end of the cutter bar in a manner well known to those skilled in the art. The adjusting levers and linkage are omitted for the sake of clarity. A drag link 45 has an outer end portion 46 which turns rearwardly into a socket 49 in the shoe arch 37, providing for swinging movement of the drag link 45 relative to the arch 37 about the fore and aft extending axis of the end portion 46. The drag link 45 extends forwardly and inwardly and is pivotally connected by means of a bolt 47 to the forward end of a longitudinal support 48 fixed to the transverse frame member 21, as shown in the patent referred to below.

The cutter bar 35 is provided with a conventional reciprocating sickle 50, which is driven by a pitman 51, the latter being connected to a crank pin 52 on a fly wheel 53 mounted at the forward end of the fly wheel shaft 54, which is journaled in the drive housing 41. The shaft 54 is driven by means of a V belt 60, trained over a sheave 59 mounted on the shaft 54 and driven by a sheave 61, which is fixed to a drive shaft 62 supported in a bearing housing 63 which is rigidly fixed to the tranverse member 43 of the frame 19. The drive shaft 62 is connected to the power take-off shaft 64 of the tractor 10 through a flexible power shaft 65, comprising a pair of telescoping shaft sections 66—67, one of which is connected through a universal joint 68 to the power take-off shaft 64 and the other 67 being connected through a universal joint 69 to the power shaft 62. The support 48 extends rearwardly from the member 21 around the flywheel 53 and is fixed to the housing 41.

The mower as described briefly thus far, is a conventional type of mower well known to those skilled in the art, and therefore, it is not considered necessary to include all the details of construction and the operation in this description. Further description of this type of mower may be found in my prior Patents 2,225,156, issued December 17, 1940, and No. 1,946,541, issued February 13, 1934.

Coming now to that part of the structure with which my present invention is more directly concerned, a trough 70 is provided in back of and generally paralleling the cutter bar 35, the floor of the trough 70 being fixed to the cutter bar and extending rearwardly therefrom and curving upwardly at 71 to provide a back wall. The trough 70 extends from the outer end of the cutter bar 35 and is provided with an end wall 72 substantially in alignment with the end of the cutter bar 35 and extending forwardly to a divider shoe 73 which projects forwardly ahead of the cutter bar and sickle. The trough 70 terminates at its inner end intermediate the ends of the cutter bar 35, the inner end of the trough being open.

As the mower advances in the field during operation, the hay or grain crop that is severed by the sickle 50 and cutter bar 35, falls rearwardly over the latter into the trough 70, and is conveyed laterally through the trough by means of an auger conveyor 75. The conveyor 75 comprises a supporting shaft 76, on which is mounted a plurality of auger sections 77, each of which includes a short tubular shaft section 78 on which is wound a helical conveyor flight or vane 79. Preferably, the helical section 79 on each of the auger units 77 forms a single convolution about the sleeve section 78, so that when auger sections 77 are assembled on the shaft 76 by sliding the tubular shaft 78 over the supporting shaft 76, the sections fit together to form a continuous auger which is substantially co-extensive with the auger trough 70, both the auger flight and the trough terminating intermediate the ends of the cutter bar 35. The auger sections 77 are fixed to the shaft 76 by pins 80 which can be inserted through apertures in the tubular shaft sections 78 and through aligned diametrical holes 81 in the supporting shaft 76.

A second auger trough section 82 is mounted at the rear of the cutter bar 35 adjacent the inner end thereof in transverse alignment with the trough 70. Both of the trough sections 70, 82, are secured to the cutter bar 35 by bolts, rivets, or by welding, or by any other suitable methods known to those skilled in the art. The outer end of the inner trough section 82 terminates in laterally spaced relation to the inner end of the outer section 70 to provide an open space S therebetween in which the crop severed by the cutter car falls over the latter to the ground and into which the auger 75 delivers the crop which falls into the auger trough 70 to form a windrow on the ground. The inner auger trough 82 is also provided with an auger section 77' which is substantially co-extensive therewith and is mounted on the inner end of the shaft 76. The auger section 77' is provided with a helical flight 79' which is wound in the opposite direction about the tubular shaft section 78', as compared with the direction of winding of the auger flight 79, with the result that the crop which drops into the inner trough 82 is moved laterally outwardly and discharged into the space S to form the windrow.

It will be noted that in Figure 1 the space S is offset from the center of the cutter bar toward the left, so that the outer auger section 75 is composed of five auger units 77, while the inner auger section is composed of one auger unit 77'. This is the arrangement which is preferable for a tractor of the tricycle type in which the front wheels are disposed closely together at the center of the tractor. Thus, in the succeeding trip around the field, the tractor runs in the space now occupied by the cutter bar, straddling the windrow, which is laid in the space S, between the front wheels (not shown) and the left hand tractor wheel 13. In this location of the windrow, there is nothing on the tractor or mower to interfere with the windrow as the tractor straddles the latter, whereas if the windrow were to be offset to the right of the front wheels of the tractor the crop would become tangled with the supporting arm 38 and the pitman 51, as will be readily understood from an inspection of Figure 3.

The outer end of the supporting shaft 76 is journaled in a bearing 85, which is supported in the end wall 72, while the inner end of the shaft 76 is journaled in a bearing 86 in an end wall 87 provided at the inner end of the trough section 82. A stripper plate 88 extends forwardly from the upper portion of the back wall 71, the forward edge of the plate 88 lying adjacent the edge of the helical flight 79 and serving as a stripper to prevent the crop from winding around the auger, in a manner well known to those skilled in the art.

The same mower can be used with four wheel tractors, of the type in which the front wheels are disposed in forward alignment with the traction wheels 13, by providing a windrowing attachment in which the space S is directly in the center of the cutter bar 35. This is the most favorable location for four wheel tractors, in as much as the greatest clearance above the ground in this type of tractor is usually in the center. This can be accomplished by dividing the trough 70 along its fore and aft line of division, indicated at 90, detaching the inner section from the outer trough 70 and shifting it inwardly in abutment with the inner trough 82, fixing the shifted section of the trough to the cutter bar in its new location. The space S between the two troughs is the center of the cutter bar 35. The auger 75 is then removed and the two inner sections 77 are removed from the shaft 76, while two new sections having flights wound in the same direction as the inner section 77' are placed on the shaft to make the inner auger section co-extensive with the longer section of trough. The embodiment of Figure 6 shows a windrowing attachment in which the windrow space S' is in the center of the cutter bar.

In Figures 1 and 2, the shaft 76 is driven in a clockwise direction, as viewed in Figure 2, by means of a flexible drive shaft 91 comprising a pair of telescoping sections 92, one of which is connected through a universal joint 93 to the inner end of the shaft 76, and the other of which is connected through a universal joint 94 to a pair of inter-meshing beveled gears 95, 96 within a gear housing 97, a portion of which is broken away to show the gears. The gear 96 is fixed to a shaft 98 which extends in a fore and aft direction in the housing 97 and projects rearwardly to support a sheave 99, the latter being connected by a flexible power transmitting belt 100 to a sheave 101 mounted on the rear end of the shaft 62. The flexible power transmitting shaft 91 permits the cutter bar to be raised and lowered without affecting the rotation of the auger.

In certain crop conditions the shaft 76 spanning the windrow space S would not greatly affect the flow of severed crops into the windrow on the ground, but in other crop conditions this portion of the shaft would interfere with the formation of the windrow. In the embodiment of Figures 4 and 5, this has been corrected by providing a pair of straight beater blades 105 and 106 extending axially along the shaft 76 and spanning the window space S. The blades 105, 106 are rigidly mounted on a sleeve or tubular shaft 107, which slides onto the shaft 76 and is secured by the pins 81. Each of the blades 105, 106 connects with the end of one of the adjoining auger flights 79, 79', the opposite ends being secured by means of a suitable flange 108 to the side of the flight along the line of intersection. The outer edges of the blades 105, 106 are serrated as shown at 109 and serve to push the severed crops under the shaft 76 into the windrow.

The embodiment of Figures 4 and 5 also shows a modified means for driving the auger, in the form of a ground-engageable wheel 110 secured to an axle 111 which is journaled in a pair of arms 112 projecting rearwardly from the outer end of the trough 70. A sprocket 113 is fixed to the shaft 111 and drives a sprocket 114 on the outer end of the auger shaft 76, by means of a flexible drive chain 115.

Under some crop conditions it would be highly desirable not to have any shaft or beater sections spanning the windrow space S. The embodiment shown in Figures 6 and 7 show a windrowing attachment in which the space S' is entirely clear, This embodiment is illustrated by a mower with a space S' in the center of the cutter bar, for a four wheel type tractor, although this embodiment could be arranged as described above with the space S' offset to one side of the center of the cutter bar. This embodiment involves the problem of means for transmitting power to the outer auger 75 for driving the latter, without interference in the open space S'. One method is, of course, to provide a ground-engaging wheel 110 as shown in Figures 4 and 5. As shown in Figures 6 and 7, however, I have provided a power transmitting shaft 120 which extends outwardly along the cutter bar 35 behind the rear edge 121 of the latter, and a U-shaped sheet metal enclosure 122 has its top and bottom sides secured flat to the top and bottom of the cutter bar 35 and secured thereto by counter sunk bolts 123, while the curved portion of the U-shaped housing 122 passes forwardly above and below the shaft 120 to protect the latter from being entangled with the crop material.

The two auger sections 75, 75', are mounted on supporting shafts 125, 126, which are rotatably supported in journal bearings 127, 128, respectively, each of the latter being sufficiently long to support the associated shaft section 125, 126, entirely from one end, leaving the two inner ends of the augers unsupported. The flexible power shaft 91 is connected through the universal joint 93 to the inner end of the inner shaft section 126, while the outer shaft section 125 is driven through a flexible drive chain 130, which is trained over a pair of sprockets 131, 132, fixed to power shaft 122 and to the supporting shaft 125, respectively. The inner end of the power shaft 122 is connected to a flexible drive chain 133, which is trained over a pair of sprockets 134, 135, mounted on the shaft 122, 126, respectively.

Figures 8 and 9 show another embodiment in which the power for driving the outer section of the auger is transmitted through the shaft 140 of a harvester reel 141, which is mounted above the cutter bar and serves to urge the harvested crops rearwardly over the latter. The reel 141 comprises a plurality of spiders 142 mounted in spaced relation on the shaft 140, with a plurality of axially extending crop-engaging bats 143 mounted on the outer ends of the arms of the spiders 142. The outer and inner ends of the reel shaft 140 are supported in bearings 144 which are carried on a pair of supporting arms 145 which extend upwardly from the inner and outer ends of the cutter bar 35, respectively, the outer arm 145 being mounted on the end 72 of the trough 70.

Power is transmitted to drive the reel through the flexible power shaft 91, which is connected through the universal joint 93 to a stub shaft 146, carried in a bearing 147 on a frame member 148 which is rigidly fixed to the mower shoe. The stub shaft 146 is connected to the reel shaft 140 by means of a power transmitting belt 150, which is trained over a pair of sheaves 151, 152, mounted on the stub shaft 146 and the inner end of the reel shaft 140, respectively. The outer end of the reel shaft 140 is connected to drive the auger shaft 125 through a flexible belt 153 which is trained over a sheave 154 on the reel shaft 140 and over a sheave 155 on the outer end of the auger shaft 125. The inner end of the auger shaft 125 is supported in a bearing 156, which is supported on an arm 157 which extends forwardly and downwardly over the stripper plate 88.

In this embodiment, which is arranged for a three-wheel type tractor, the inner auger is replaced by a plurality of swathing rods 160 which are secured at their forward ends to the cutter bar 35 and extend rearwardly therefrom, curving outwardly at their rear ends to lay the harvested crop over in a windrow space S.

During operation, the tractor advances with the cutter bar extended laterally therefrom, cutting a swath alongside the path of the tractor and laying the windrow in the space S. The crops severed by the inner and outer ends of the cutter bar are conveyed toward the space S by the two auger sections 75, 75', or by the rods 160, in the case of Figure 8. During operation, the cutter bar, together with the auger troughs and augers, are free to float along the surface of the ground as a unitary assembly, the longitudinal pivot axis of the inner and outer ends of the supporting arm 38 providing for free vertical movement of the cutter bar and windrower attachment. Similarly, the ground wheel in Figure 4 also moves vertically with the cutter bar 35, and the reel 141 in Figure 8 has a similar movement.

I do not intend my invention to be limited to the exact details shown and described herein except as set forth in the claims which follow.

I claim:

1. A windrowing attachment for a mower having a vertically swingable transverse supporting arm and a cutter bar pivotally mounted at the outer end of said arm for vertical angular movement about a fore and aft extending axis, said attachment comprising in combination, a trough extending transversely behind said cutter bar and mounted thereon for vertical swinging movement therewith, for receiving severed crops therefrom, said trough extending inwardly from the outer end of said cutter bar and terminating at a point spaced outwardly from the inner end of the latter to provide a space therebetween in which severed crops are allowed to fall to the ground, and an auger rotatably mounted in said trough and having a helical flight normally operative to convey crops through to said trough and discharge them into said space in a windrow on the ground.

2. A windrowing machine comprising in combination, a mobile frame, a generally transversely extending supporting arm swingably connected thereto for movement about a fore and aft extending axis, a transverse cutter bar pivotally mounted on the outer end of said arm for vertical angular movement about a fore and aft extending axis, a trough behind and generally paralleling said cutter bar and mounted thereon for vertical swinging movement therewith and for receiving severed crops therefrom, said trough extending inwardly from the outer end of said cutter bar and terminating at a point spaced outwardly from said pivot axis between the arm and cutter bar to provide a space therebetween in which severed crops are allowed to fall to the ground, and an auger rotatably mounted in said trough and having a helical flight normally operative to convey crops through said trough and discharge them into said space in a windrow on the ground.

3. A windrowing machine comprising in combination, a mobile frame, a generally transversely extending supporting arm swingably connected thereto for movement about a fore and aft extending axis, a transverse cutter bar pivotally mounted on the outer end of said arm for vertical angular movement about a fore and aft extending axis, a trough behind and generally paralleling said cutter bar and mounted thereon for vertical swinging movement therewith for receiving severed crops therefrom, said trough extending inwardly from the outer end of said cutter bar and terminating intermediate the ends of said cutter bar, a second trough mounted behind said cutter bar and extending outwardly from the inner end of the latter and terminating at a point spaced inwardly from the inner end of the first mentioned trough to provide a space therebetween in which severed crops fall to the ground, and auger conveying means rotatable in said troughs and normally operative to convey crops in said troughs toward said space and discharge them into the latter in a windrow on the ground.

4. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar, a second trough mounted behind said cutter bar and extending outwardly from the inner end of the latter and terminating at a point spaced laterally from the inner end of the first mentioned trough to provide a space therebetween in which severed crops are allowed to fall to the ground, and auger conveying means rotatable in said troughs comprising a continuous transverse shaft extending through said troughs and across said space and a pair of helical flights mounted on said shaft and generally coextensive with said troughs, respectively, for conveying crops in said troughs toward said space and discharging them into the latter in a windrow upon the ground.

5. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar, a second trough mounted behind said cutter bar and extending outwardly from the inner end of the first mentioned trough to provide a space therebetween in which severed crops are allowed to fall to the ground, and auger conveying means rotatable in said troughs comprising a continuous transverse shaft extending through said troughs and across said space, a pair of helical flights mounted on said shaft and generally coextensive with said troughs, respectively, for conveying crops in said troughs toward said space and discharging them into the latter in a windrow upon the ground, and a pair of beater members extending axially along said shaft on opposite sides thereof across said windrow space between the adjacent ends of said auger flights.

6. A windrowing machine comprising a transverse cutter bar, a trough extending transversely behind said cutter bar and mounted thereon for receiving severed crops therefrom, said trough extending inwardly from the outer end of said cutter bar and terminating intermediate the ends of said cutter bar, a second trough mounted behind said cutter bar and extending outwardly from the inner end of the latter and terminating at a point spaced laterally from the inner end of the first mentioned trough to provide a space therebetween in which severed crops are allowed to fall to the ground, one of said troughs comprising an assembly of aligned trough sections, one of said sections being detachable therefrom and attachable at the adjacent end of the other of said troughs, thereby to shift the position of said crop discharge space along said cutter bar, and auger conveying means rotatable in said troughs comprising a continuous transverse shaft extending through said troughs and across said space, a plurality of auger sections mounted on said shaft, each of said sections comprising a sleeve slidably embracing said shaft and a helical vane encircling the sleeve and fixed thereto, and means for rigidly fixing said sleeves on said shaft arranged in selected numbers of units from each end of said cutter bar to form two continuous helical auger conveyors in the two laterally spaced troughs, respectively, to accommodate different lengths of troughs determining the lateral position of said windrow space relative to said cutter bar.

7. A windrowing machine comprising a transverse cutter bar, a trough extending transversely behind said cutter bar and mounted thereon for receiving severed crops therefrom, said trough extending inwardly from the outer end of said cutter bar and terminating intermediate the ends of said cutter bar, a second trough mounted behind said cutter bar and extending outwardly from the inner end of the latter and terminating at a point spaced laterally from the inner end of the first mentioned trough to provide a space therebetween in which severed crops are allowed to fall to the ground, one of said troughs comprising an assembly of aligned trough sections, one of said sections being detachable therefrom and attachable at the adjacent end of the other of said troughs, thereby to shift the position of said crop discharge space along said cutter bar, and auger conveying means rotatable in said troughs comprising a continuous transverse shaft extending through said troughs and across said space, a plurality of auger sections mounted on said shaft, each of said sections comprising a sleeve slidably embracing said shaft and a helical vane encircling the sleeve and fixed thereto, and means for rigidly fixing said sleeves on said shaft arranged in selected numbers of units from each end of said cutter bar to form two continuous helical auger conveyors in the two laterally spaced troughs, respectively, to accommodate different lengths of troughs determining the lateral position of said windrow space relative to said cutter bar, and a beater section adapted to be mounted on said shaft between said helical conveyors, said beater section comprising a sleeve slidably embracing said shaft and a pair of axially extending beater members fixed to said sleeve on opposite sides thereof.

8. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar to provide a space between the inner ends of said trough and said cutter bar in which severed crops are allowed to fall to the ground, an auger rotatably mounted in said trough and normally operative to convey crops through said trough and discharge them into said space in a windrow on the ground, drive mechanism disposed near the inner end of said cutter bar, and power transmitting means for driving said auger including a shaft mounted on and extending outwardly along said cutter bar and means connecting the outer ends of said shaft and said auger in driving relation.

9. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar to provide a space between the inner ends of said trough and said cutter bar in which severed crops are allowed to fall to the ground, an auger rotatably mounted in said trough and normally operative to convey crops through said trough and discharge them into said space in a windrow on the ground, drive mechanism disposed near the inner end of said cutter bar, and power transmitting means for driving said auger including a shaft mounted on and extending outwardly behind the rear edge of said cutter bar, an enclosure fixed to said cutter bar and extending rearwardly over said shaft over which enclosure the severed crops slide, and means connecting the outer ends of said shaft and said auger in driving relation.

10. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar, a second trough section mounted behind said cutter and extending outwardly from the inner end of the latter and terminating at a point spaced laterally from the inner end of the first mentioned trough to provide a space therebetween in which severed crops are allowed to fall to the ground, a pair of augers rotatably disposed in said troughs, respectively, for conveying severed crops in said troughs toward said space and discharging them into the latter in a windrow upon the ground, drive mechanism disposed near the inner end of said cutter bar and including a drive shaft connected to the inner auger for driving the latter, and power transmitting means for driving the outer of said augers, including a second shaft mounted on and extending outwardly along said cutter bar, means connecting the inner end of said shaft to said drive shaft, and means connecting the outer end of said second shaft to the outer auger in driving relation.

11. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar, a second trough section mounted behind said cutter bar and extending outwardly from the inner end of the latter and terminating at a point spaced laterally from the inner end of the first mentioned trough to provide a space therebetween in which severed crops are allowed to fall to the ground, a pair of augers rotatably disposed in said troughs, respectively, for conveying severed crops in said troughs toward said space and discharging them into the latter in a windrow upon the ground, each of said augers comprising a shaft and a helical vane mounted thereon, said shafts being disposed in coaxial relation on opposite sides of said windrow space, drive mechanism disposed near the inner end of said cutter bar connected to the inner of said augers, a power transmitting shaft extending transversely behind the rear edge of said cutter bar, power transmitting connections between said shaft and said auger shafts, respectively, and a sheet metal enclosure for said power transmitting shaft.

12. A windrowing machine comprising in combination, a mobile frame, a supporting arm swingably connected thereto for vertical movement about a fore and aft extending axis, a transverse cutter bar having a supporting shoe pivotally mounted on the outer end of said arm providing for vertical angular movement of said cutter bar relative thereto about a fore and aft extending axis, a trough extending transversely behind said cutter bar and mounted thereon for receiving severed crops therefrom, said trough extending inwardly from the outer end of said cutter bar and terminating intermediate the ends of said cutter bar to provide a space between the inner ends of said trough and said cutter bar in which severed crops are allowed to fall to the ground, an auger rotatably mounted in said trough and normally operative to convey crops through said trough and discharge them into said space in a windrow on the ground, a harvester reel rotatably supported on said cutter bar for moving the severed crops thereover, drive mechanism disposed near the inner end of said cutter bar, power transmitting means adjacent the inner end of said reel connecting said drive mechanism with said reel to drive the latter, and power transmitting means adjacent the outer end of said reel connecting the reel with said auger for driving the latter.

13. A windrowing machine comprising a vertically swingable supporting arm, a mower shoe pivoted at the outer end thereof, a transverse cutter bar mounted on said shoe, a trough mounted on the rear of said cutter bar and extending from the outer end of said cutter bar inwardly to a point spaced outwardly from said shoe to provide a space in which severed crops are allowed to fall to the ground, an auger rotatably mounted in said trough for conveying crops therethrough and discharging them into said space in a windrow on the ground, a ground engageable wheel mounted at the outer end of said cutter bar behind said trough, power transmitting wheels mounted on said ground wheel and said auger, and an endless flexible member trained over said wheels for driving said auger by power transmitted through said ground wheel.

14. A windrowing attachment for a mower of the type comprising a mobile frame, a vertically swingable, transversely disposed supporting arm mounted on said frame, a transversely disposed cutter bar pivotally mounted on the outer end of said arm for vertical swinging movement relative thereto, a sickle associated with said cutter bar, and power actuated mechanism for driving said sickle, said attachment comprising, in combination, a trough adapted to be mounted on the rear edge of said cutter bar for receiving severed crops therefrom, said trough extending inwardly from the outer end of said cutter bar and terminating intermediate the ends of the latter to provide a space behind said cutter bar in which severed crops are allowed to fall to the ground, an auger conveyer rotatably mounted in said trough for conveying crops therethrough and discharging the same from the inner end thereof into said space in a windrow on the ground, a drive housing adapted to be attached to said mower frame, power transmitting means in said housing adapted for connection with said power actuated mechanism including a drive shaft extending laterally from said housing behind said arm and having a power transmitting connection with said auger.

15. A windrowing attachment for a mower of the type comprising a mobile frame, a vertically swingable, transversely disposed supporting arm mounted on said frame, a transversely disposed cutter bar pivotally mounted on the outer end of said arm for vertical swinging movement relative thereto, a sickle associated with said cutter bar, and power actuated mechanism for driving said sickle, said attachment comprising, in combination, a trough adapted to be mounted on the rear edge of said cutter bar for receiving severed crops therefrom, said trough extending inwardly from the outer end of said cutter bar and terminating intermediate the ends of the latter to provide a space behind said cutter bar in which severed crops are allowed to fall to the ground, a second trough adapted to be mounted on the rear edge of said cutter bar extending outwardly from the inner end of the latter and terminating at a point spaced laterally from the inner end of the first mentioned trough, auger conveying means rotatably mounted in said troughs comprising a continuous transverse shaft extending through said troughs and across said space and a pair of opposed helical flights mounted on said shaft and generally coextensive with said troughs, respectively, for conveying crops in said troughs toward said space, a drive housing adapted to be attached to said mower frame, power transmitting means in said housing adapted for connection with said power actuated mechanism including a drive shaft extending laterally from said housing behind said arm and having a power transmitting connection with said auger shaft.

16. A windrowing machine comprising a transverse cutter bar, a trough extending transversely behind said cutter bar and mounted thereon for receiving severed crops therefrom, said trough extending inwardly from the outer end of said cutter bar and terminating intermediate the ends of said cutter bar, a second trough mounted behind said cutter bar and extending outwardly from the inner end of the latter and terminating at a point spaced laterally from the inner end of the first mentioned trough to provide a space therebetween in which severed crops are allowed to fall to the ground, one of said troughs comprising an assembly of aligned trough sections, one of said sections being detachable therefrom and attachable at the adjacent end of the other of said troughs, thereby to shift the position of said crop discharge space along said cutter bar, and auger conveying means rotatable in said troughs comprising a plurality of auger sections, each section including a shaft portion and a helical vane portion encircling said shaft portion and fixed thereto, and means for rigidly connecting said shaft portions together in end-to-end relation in selected numbers of units from each end of said cutter bar to form two continuous auger conveyors in the two laterally spaced troughs, respectively, to correspond in length with different lengths of troughs, to determine the lateral position of said windrow space relative to said cutter bar.

17. A windrowing machine comprising a vertically swingable supporting arm, a mower shoe pivoted at the outer end thereof, a transverse cutter bar mounted on said shoe, a trough mounted on the rear of said cutter bar and extending from the outer end of said cutter bar inwardly to a point spaced outwardly from said shoe to provide a space in which severed crops are allowed to fall to the ground, an auger rotatably mounted in said trough for conveying crops therethrough and discharging them into said space in a windrow on the ground, a ground engageable wheel mounted at the outer end of said cutter bar behind said trough, and drive means interconnecting the wheel and auger to drive the latter by the former.

WILBUR J. COULTAS.

REFERENCES CITED

The following references are of record in the file of this patent:

UNITED STATES PATENTS

| Number | Name | Date |
|---|---|---|
| 420,329 | Bovee | Jan. 28, 1890 |
| 1,792,691 | Harris et al. | Feb. 17, 1931 |
| 1,917,556 | Soss | July 11, 1933 |
| 1,926,709 | Bunting | Sept. 12, 1933 |
| 1,959,689 | Ronning | May 22, 1934 |
| 2,071,844 | Korsmo et al. | Feb. 23, 1937 |
| 2,225,156 | Coultas | Dec. 17, 1940 |
| 2,251,655 | Bostic | Aug. 5, 1941 |
| 2,281,059 | Anderson et al. | Apr. 28, 1942 |
| 2,292,958 | Millard et al. | Aug. 11, 1942 |

FOREIGN PATENTS

| Number | Country | Date |
|---|---|---|
| 9,768 | Australia | 1927 |